United States Patent
Melchior et al.

(10) Patent No.: US 6,614,963 B2
(45) Date of Patent: Sep. 2, 2003

(54) MODULE FOR OPTICAL SIGNAL TRANSMISSION

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/910,344

(22) Filed: Jul. 20, 2001

(65) Prior Publication Data

US 2002/0176667 A1 Nov. 28, 2002

(30) Foreign Application Priority Data

May 23, 2001 (DE) ............... PCT/DE01/02076

(51) Int. Cl.[7] ............... G02B 6/26; G02B 6/42
(52) U.S. Cl. ............... 385/47; 385/31; 385/39; 385/49
(58) Field of Search ............... 385/31, 47, 39, 385/49

(56) References Cited

U.S. PATENT DOCUMENTS

| | | | | |
|---|---|---|---|---|
| 4,351,585 A | * | 9/1982 | Winzer et al. | 385/44 |
| 4,750,795 A | * | 6/1988 | Blotekjaer | 385/24 |
| 4,760,569 A | | 7/1988 | Mahlein | |
| 4,767,171 A | * | 8/1988 | Keil et al. | 359/114 |
| 4,860,294 A | * | 8/1989 | Winzer et al. | 385/24 |
| 4,881,789 A | | 11/1989 | Levinson | |
| 5,031,984 A | * | 7/1991 | Eide et al. | 385/15 |
| 5,127,075 A | * | 6/1992 | Althaus et al. | 250/227.14 |
| 5,277,930 A | | 1/1994 | Uchida | |
| 5,408,559 A | * | 4/1995 | Takahashi et al. | 385/89 |
| 5,552,918 A | * | 9/1996 | Krug et al. | 359/152 |
| 5,841,562 A | | 11/1998 | Rangwala et al. | |
| 5,898,803 A | * | 4/1999 | Mueller-Fiedler et al. | 385/14 |
| 6,142,680 A | * | 11/2000 | Kikuchi et al. | 385/47 |
| 6,144,784 A | * | 11/2000 | Shigehara et al. | 385/24 |
| 6,334,716 B1 | * | 1/2002 | Ojima et al. | 359/152 |
| 6,351,584 B1 | * | 2/2002 | Horie et al. | 385/31 |

FOREIGN PATENT DOCUMENTS

| | | |
|---|---|---|
| EP | 0 238 977 A2 | 9/1987 |
| EP | 0 844 503 A1 | 5/1998 |
| EP | 0 901 023 A2 | 3/1999 |

* cited by examiner

Primary Examiner—Brian Healy
Assistant Examiner—Daniel Petkovsek
(74) Attorney, Agent, or Firm—Laurence A. Greenberg; Werner H. Stemer; Gregory L. Mayback

(57) ABSTRACT

The module for optical signal transmission has a transmitting or receiving component mounted on a carrier. At least one optical waveguide, whose two ends represent an optical input and an optical output of the module, is associated with the transmitting or receiving component. A wavelength-selective element is arranged or formed in the optical waveguide and injects into the optical waveguide or outputs from it light, which is emitted from or received by the transmitting or receiving element, for a specific optical data channel. The light is injected into or output from the optical waveguide essentially at right angles to the optical axis of the optical waveguide.

19 Claims, 4 Drawing Sheets

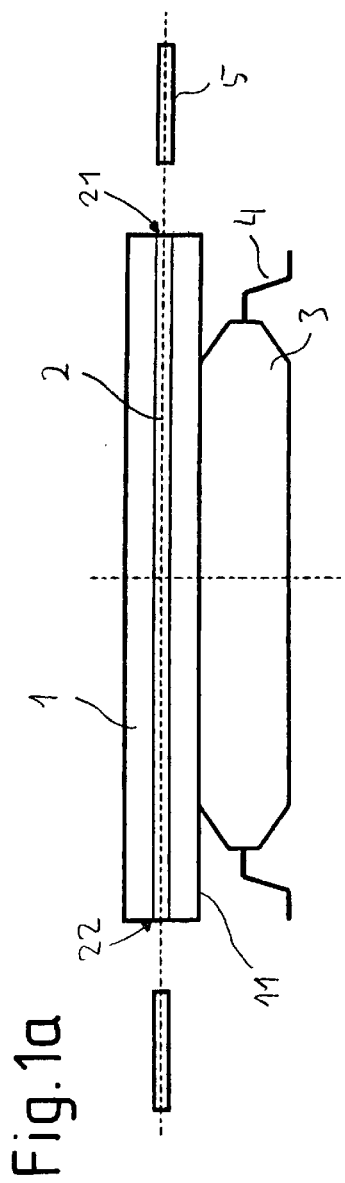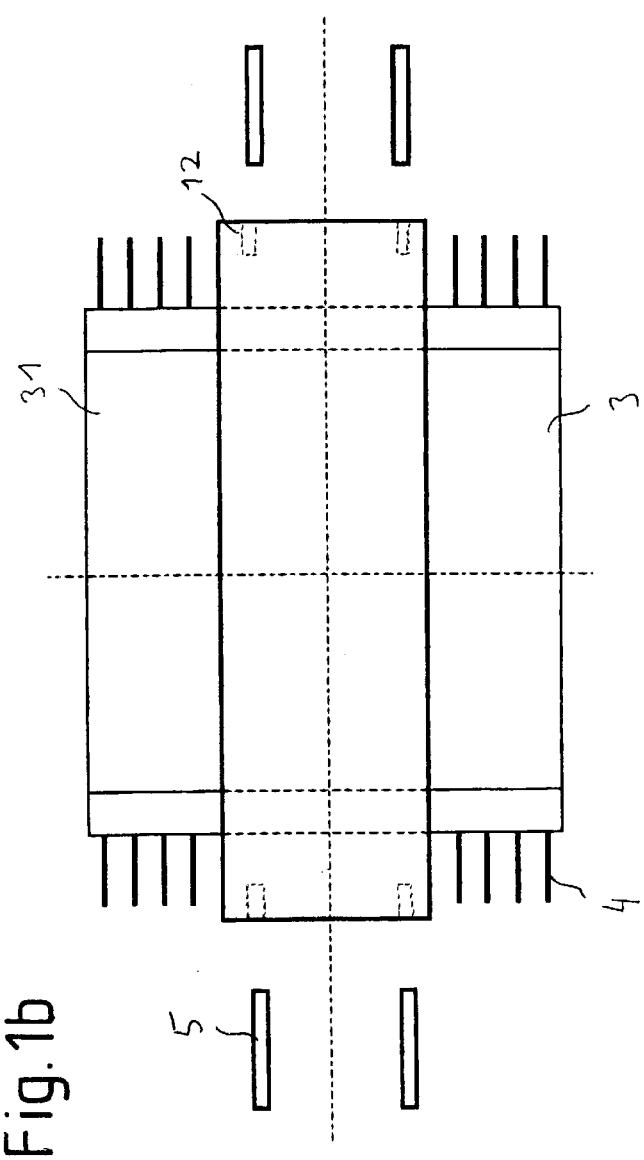

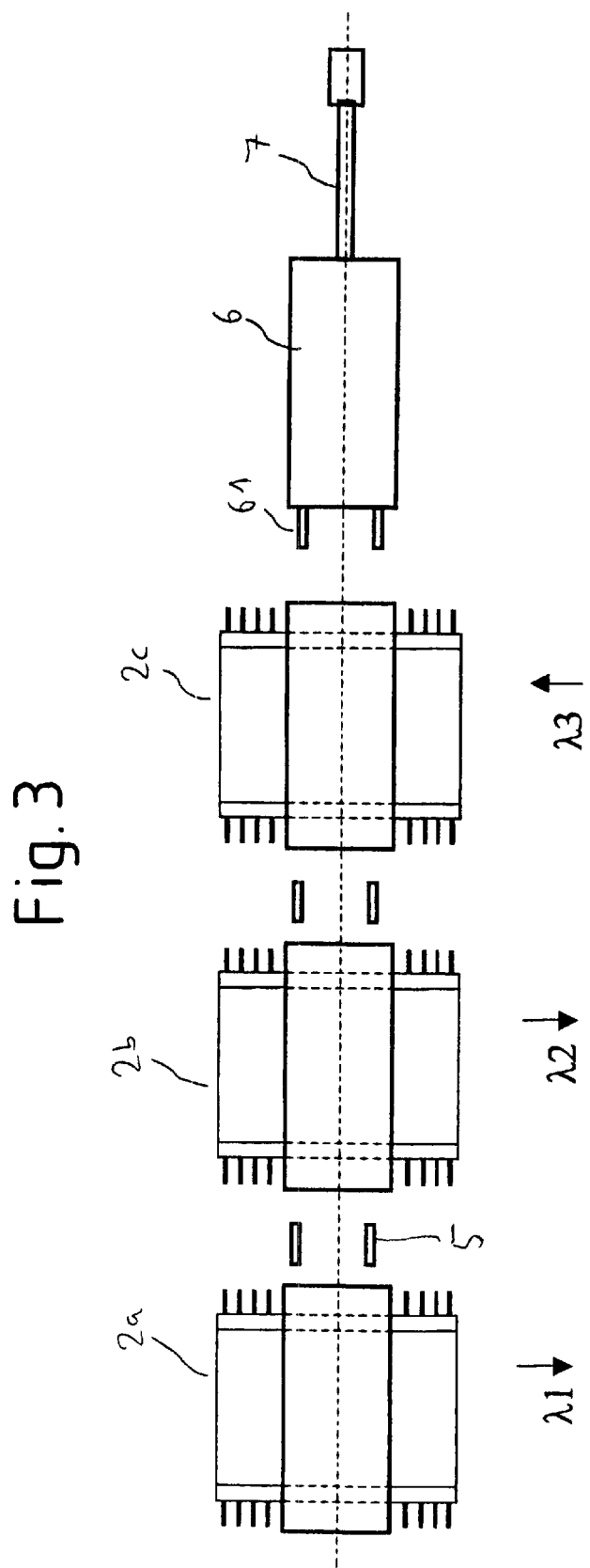

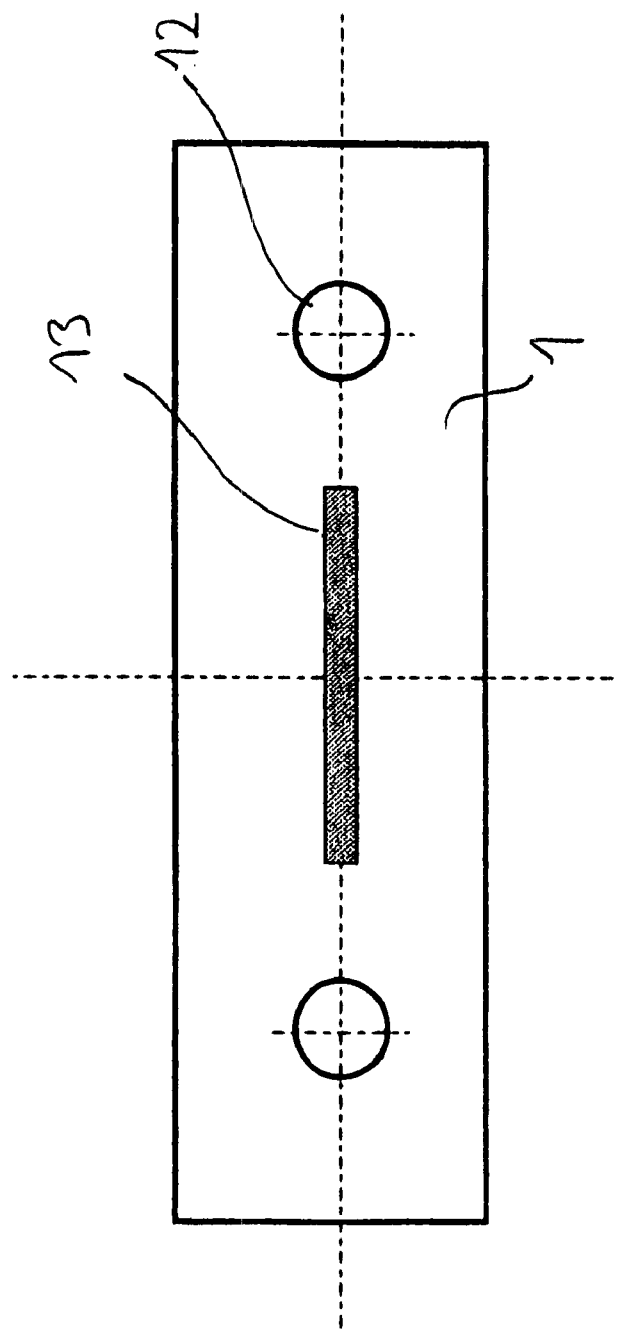

MODULE FOR OPTICAL SIGNAL TRANSMISSION

BACKGROUND OF THE INVENTION

FIELD OF THE INVENTION

The invention relates to a module for optical signal transmission, and to a transmitting and/or receiving apparatus having such a module.

Modules for bidirectional optical data traffic operate, for example, using a star structure in such a way that data streams are transmitted in opposite directions—in the direction to a central feed point (upstream) and in the direction to further receivers (downstream) in an optical fiber. Identical or different wavelengths can thereby be used for the individual data channels. There is a need to achieve ever higher data rates, with the costs decreasing. Wavelength-division multiplexing methods are used in particular for this purpose wherein light signals at a number of wavelengths are transmitted simultaneously on one optical fiber.

In this case, it is necessary to separate the light signals which are at a number of wavelengths in the receiver once again. In addition, it should be possible to transmit optical signals from the receiver in the direction of the feed point. There is thus a need for electrooptical modules with a number of optical ports.

U.S. Pat. No. 4,767,171 (see European patent application EP 238 977) discloses a transmitting and receiving module for a bidirectional communications network having free-beam optics, wherein spherical lenses are arranged at a distance from one another between a laser diode and the end of an optical fiber, and focus the laser light onto the end of the fiber. A wavelength-selective beam splitter is arranged between the spherical lenses for wavelength separation and separates from the beam path light which is transmitted from the light fiber end and is at a wavelength other than the wavelength of the laser light, and supplies this light to a detector or receiving component.

A disadvantage of that prior art module is that a number of highly complex assembly steps are required successively, each of which involves the use of substantial resources. If one assembly step in the process is unsuccessful, the previous assembly steps must also be rejected.

SUMMARY OF THE INVENTION

The object of the present invention is to provide a module for optical signal transmission which overcomes the above-noted deficiencies and disadvantages of the prior art devices and methods of this general kind, and which provides for a transceiver for at least two data channels, which has a simple, compact modular design and which can be produced cost-effectively.

With the above and other objects in view there is provided, in accordance with the invention, a module for optical signal transmission, comprising:

a carrier;

at least one transmitting or receiving component mounted on the carrier;

at least one optical waveguide having an optical axis, a first end representing an optical input of the module, and a second end representing an optical output of the module; and a wavelength-selective element disposed in the optical waveguide and configured to couple light of a specific optical data channel from the optical waveguide to the transmitting or receiving component or inject into the optical waveguide light emitted from the transmitting or receiving element;

whereby the light is injected into or coupled out of the optical waveguide substantially perpendicular to the optical axis of the optical waveguide.

In other words, the object of the invention is to provide at least one optical waveguide in the module, the two ends of which optical waveguide represent an optical input and an optical output of the module, and each of which has an associated transmitting or receiving component. A wavelength-selective element is arranged or formed in the optical waveguide and injects into the optical waveguide, or outputs from it, light, which is emitted from or received by a transmitting or receiving element for a specific optical data channel, without influencing the other data channels. Light is in this case injected into or output from the optical waveguide, essentially at right angles to the optical axis of the optical waveguide.

The expression "substantially perpendicular" in this case means that the angle is such that light which falls on the wavelength-selective element is allowed to be deflected into the optical waveguide and vice versa.

The solution according to the invention provides a design concept which is based on the use of a type of optical "T-element", wherein the horizontal "T-bar" is provided by a continuous optical waveguide. Light is output from and injected into the optical waveguide between the optical input and output essentially at right angles to the optical axis of the optical waveguide. The interfaces of this module are two optical interfaces at the two ends of the optical waveguide and an electrical interface for making electrical contact between the transmitting or receiving component, and, in particular, a printed circuit board.

The optical module can be cascaded, and a transmitting and/or receiving device according to the invention accordingly has a number of modules which are arranged one behind the other. The fact that the individual modules can be combined as required, means that, depending on the application, it is possible to provide multiplexes and/or demultiplexes in principle for any desired number of data channels, with light at one wavelength being injected or output in each module. The combination options for the individual modules or "T-elements" also allow the data rates to be upgraded or provided retrospectively on a customer-specific basis.

A further advantage of the invention is that the individual modules can involve the use of very few resources and can be produced cost-effectively. A faulty module can be replaced on its own and does not affect the functionality of a transmitting and/or receiving device.

In accordance with an added feature of the invention, the at least one optical waveguide is arranged in or on an optical waveguide body which is mounted on the carrier for the transmitting or receiving component. This results in the module having a compact arrangement. Encapsulation against external influences is also provided.

The module according to the invention can advantageously be connected by being plugged to further modules. To this end, the optical waveguide body preferably has holes via which the optical waveguide body can be connected to further optical waveguide bodies of further modules by means of centering pins. In this way, a number of modules according to the invention can easily be plugged together to form a desired transmitting and/or receiving device.

In accordance with an additional feature of the invention, the wavelength-selective element is a wavelength-selective mirror which is arranged in the optical waveguide or is formed by it. For example, the wavelength-selective mirror is formed on a push-in element which is pushed into the optical waveguide body, preferably at an angle of approximately 45°, and in the process interrupts the optical waveguide.

It is likewise within the scope of the invention to provide the wavelength-selective element by the optical waveguide forming two optical waveguide sections each having at least one inclined end surface with the optical waveguide sections being joined together axially at the inclined end surfaces. One of the abutting end surfaces of the optical waveguide sections is in this case coated with a wavelength-selective filter, with light being injected into or output from the optical waveguide for a specific optical data channel by the light for the optical data channel being passed to, or emerging from the inclined end surface at an angle to the optical axis of the optical waveguide.

In a further embodiment of the wavelength-selective element, the wavelength-selective element is formed by a Fiber-Bragg grating, which runs obliquely in the optical waveguide. In this case, a periodic refractive index change is produced in the optical waveguide by additional laser beams, in particular two crossing lasers, which results in a grating structure on which light is output or injected on a wavelength-selective basis.

A further possibility for providing a wavelength-selective element is to fit a notch in the waveguide, which notch is provided with a wavelength-selective coating.

In one preferred refinement of the module, the carrier for the transmitting or receiving component has a housing on which the optical waveguide body is mounted. This provides reliable protection against external influences. The carrier preferably and furthermore has a connecting contact for making electrical contact between the transmitting or receiving component and a printed circuit board which is formed, for example, by a lead frame.

The optical waveguide which is arranged in the waveguide body is, in one embodiment, an integrated optical conductor, for example, using glass on silicon technology. However, it is also possible for the optical waveguide to be an optical fiber, in particular a single-mode fiber, with the waveguide body being composed, for example, of a plastic.

It is within the scope of the invention for a number of optical waveguides to be arranged parallel to one another in the optical waveguide body, with each optical waveguide having a respective associated transmitting or receiving component so that the module can also be connected to an optical waveguide array.

Other features which are considered as characteristic for the invention are set forth in the appended claims.

Although the invention is illustrated and described herein as embodied in module for optical signal transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is a schematic side view of an optical module according to the invention;

FIG. 1b is a plan view of the module shown in FIG. 1a;

FIG. 3 is a schematically illustration of an assembly of a number of modules according to the invention in a transmitting and/or receiving device; and FIG. 4 is a sectional view taken through the optical waveguide body of a module to the invention.

DESCRIPTION OF THE PREFERRED EMBODIMENTS

Figure 2:
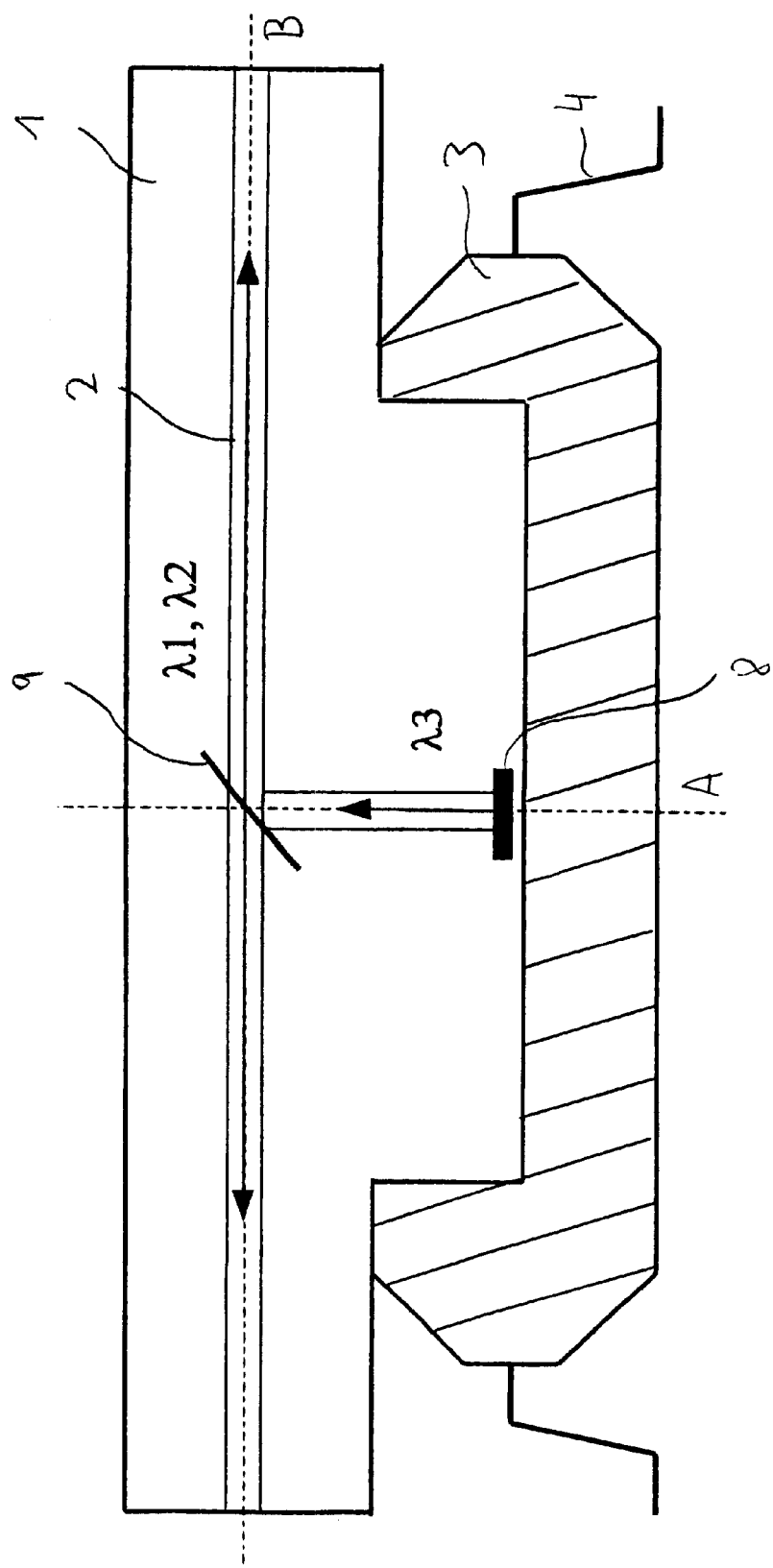
FIG. 2 is a schematic illustration of the coupling between a transmitting or receiving component and an optical waveguide in the module according to the invention.

Referring now to the figures of the drawing in detail and first, particularly, to FIGS. 1a and 1b thereof, there is seen a module according to the invention with a waveguide body 1 wherein a waveguide 2 runs horizontally. At one of its ends, the waveguide 2 has a first optical input or output 21, and at its second end it has a second optical input or output 22. In this case, the waveguide 2 is terminated in a planar manner by the waveguide body 1 at both of its ends.

Furthermore, a wavelength-selective element, which is illustrated in FIG. 2 and will be explained in more detail in the following text with reference to FIG. 2, is arranged or formed in the waveguide 2. The wavelength-selective element outputs light at a specific wavelength from the optical waveguide 2, passes it in the direction of a transmitting or receiving element (or vice versa), is transparent for light at other wavelengths, and does not influence such light.

In the illustrated exemplary embodiment, the waveguide body 1 has a cuboid shape, and is mounted by its planar lower face 11 on the upper face 31 of a carrier 3. In addition to providing the mounting for the waveguide body, the carrier 3 is used to accommodate the transmitting or receiving component, which is optically coupled to the waveguide 2, as will be explained in more detail with reference to FIG. 2. The carrier 3 has an electrical connecting contact in the form of a leadframe 4, which is used for connecting the transmitting or receiving component to a non-illustrated printed circuit board, and for making electrical contact between the transmitting or receiving component and the printed circuit board.

Retaining openings 12, into which centering pins 5 can be inserted, are provided on the end surfaces of the waveguide body 1. The centering pins 5 allow a number of modules to be plugged together, with each of the optical waveguides 2 being centered.

It will be understood, of course, that the waveguide body may also have some shape other than a cuboid shape. The only essential feature is that the waveguide body fixes the optical waveguide and, in the process, allows light coupling between the optical waveguide and the transmitting or receiving component.

The illustrated module represents an optical subassembly, which can be checked in advance individually and forms a compact unit comprising the transmitting or receiving component, the carrier and the optical waveguide.

The optical coupling between a transmitting or receiving component and an optical waveguide 2 in the module according to the invention will be explained in the following text with reference to FIG. 2. There is illustrated therein a transmitting component, in particular a laser diode 8, which is arranged on the carrier 3 and can be connected to a printed circuit board via the connecting contact 4.

A schematically illustrated wavelength-selective element 9 is incorporated into the beam path in the optical waveguide 2 at an angle of 45°. The element 9 has the characteristic of injecting or outputting light at a specific wavelength $\lambda 3$ at right angles into the optical waveguide, while being very largely transparent for light at other wavelengths $\lambda 1$, $\lambda 2$, and with this light being "looped through" so to speak. The wavelength-selective element thus results in one, and only one wavelength band, which is associated with one data channel, in each case being injected into or output from the optical waveguide 2.

An optical axis A of the laser diode 8 runs orthogonally (perpendicular) to an optical axis B of the optical waveguide 2. Small tolerances (up to 15°) from the right-angled arrangement are possible and acceptable. All that matters is that light is injected or output effectively into or from the optical waveguide 2.

The wavelength-selective element 9 may have a wide range of configurations. For example, it may be a specific Fiber-Bragg grating, which allows a transverse output. In a grating such as this, two crossing lasers produce a variation in the refractive index in the optical waveguide, and this leads to wavelength-selective refraction of the light. Furthermore, the wavelength-selective element may be a wavelength-selective mirror, which is incorporated in the waveguide body 1 and interrupts the optical waveguide 2. The waveguide-selective element may also be a notch in the optical waveguide with a wavelength-selective coating, or a wavelength section which is provided with an inclined end surface, coated such that it is wavelength-selective.

To avoid any interference with the beam path between the optical waveguide 2 and the laser diode 8, the optical waveguide body 1 and/or the carrier 3 are in each case either designed to be transparent for the respective wavelength in the region of the beam path, or to be provided with suitable cutouts in this region, wherein case the latter may be filled with an optically transparent filling compound. The exemplary embodiment in FIG. 2 shows only a schematic illustration.

Referring now to FIG. 3, there is shown a transmitting and/or receiving device according to the invention, wherein three individual modules 2a, 2b, 2c (see FIGS. 1a, 1b) are plugged together. The connection between the individual modules is in this case made via centering pins 5. The modules 2a, 2b, 2c, which are connected to one another, are connected via an optical connector 6, which may have centering pins 61, to an optical fiber 7 on which optical signals can be transmitted in both directions.

An optical waveguide, which is composed of the optical waveguides 2 (see FIG. 1a) of the individual modules, passes through the modules 2a, 2b, 2c which are connected to one another. Optical signals for a number of data channels can thus be received via the optical fiber 7 by the modules 2a, 2b, 2c and/or optical signals can be passed from the modules to the optical fiber 7. Any desired multiplex/demultiplex arrangement can thus be produced from the modules.

In the exemplary embodiment in FIG. 3 the module 2c on the right has a transmitting component whose light is injected at a first wavelength $\lambda 3$ into the optical fiber 7 by means of the wavelength-selective filter in the module 2c. The other modules 2a, 2b each have a receiving component, wherein case light at a second wavelength $\lambda 2$ is output to the receiving component of the module 2b by means of the respective wavelength-selective filter in the modules 2a, 2b, and light at a third wavelength $\lambda 1$ can be output to the receiving component of the module 2a on a wavelength-selective basis.

Thus, in the present case, light signals at a wavelength $\lambda 3$ are injected into the optical fiber 7, and light signals at two wavelengths $\lambda 1$, $\lambda 2$ are output from the optical fiber 7 and are separated by virtue of their wavelengths. The arrangement of the modules may, however, be varied, provided suitable filters are available.

FIG. 4 shows a section through the optical waveguide body 1 of a module according to the invention. The optical waveguide body 1 is composed, for example of plastic or silicon. The optical waveguides 2 are, for example, glass fibers which are inserted into the waveguide body 1. However, they may also be optically integrated (for example glass on silicon).

FIG. 4 shows, firstly, the retaining openings 12 for the centering pins 5. Furthermore, a waveguide area 13 is illustrated schematically, wherein one waveguide, or else a number of waveguides parallel to one another, is or are arranged. If there are a number of waveguides, a corresponding number of transmitting or receiving components 9 are provided on the carrier 3, or are arranged in an array.

We claim:

1. A module for optical signal transmission, comprising:
a carrier;
at least one transmitting or receiving component mounted on said carrier;
at least one optical waveguide having an optical axis, a first end representing an optical input of the module, and a second end representing an optical output of the module; and
a wavelength-selective element disposed in said optical waveguide and configured to couple light of a specific optical data channel from said optical waveguide to said transmitting or receiving component or inject into said optical waveguide light emitted from said transmitting or receiving element;
whereby the light is injected into or coupled out of said optical waveguide substantially perpendicular to said optical axis of said optical waveguide.

2. The module according to claim 1, wherein said optical waveguide is disposed in an optical waveguide body.

3. The module according to claim 1, wherein said optical waveguide is disposed on an optical waveguide body.

4. The module according to claim 1, which further comprises an optical waveguide body mounted on said carrier.

5. The module according to claim 1 configured to be plug-connected to further modules.

6. The module according to claim 4, wherein said optical waveguide body is formed with openings and said optical waveguide body is connectible to further optical waveguide bodies of further modules via said openings cooperating with centering pins.

7. The module according to claim 1, wherein said wavelength-selective element is a wavelength-selective mirror mounted in said optical waveguide.

8. The module according to claim 1, wherein said wavelength-selective element is a wavelength-selective mirror formed integrally by said optical waveguide.

9. The module according to claim 1, wherein said wavelength-selective element is a Fiber-Bragg grating.

10. The module according to claim 4, wherein said carrier has a housing and said optical waveguide body is mounted on said housing.

11. The module according to claim 1, wherein said carrier has a connecting contact configured to establish electrical contact between said transmitting or receiving component and a printed circuit board.

12. The module according to claim 1, wherein said optical waveguide is an integrated optical conductor.

13. The module according to claim 1, wherein said optical waveguide is an optical fiber.

14. The module according to claim 1, wherein said optical waveguide is a single-mode fiber.

15. The module according to claim 4, wherein a plurality of optical waveguides are arranged parallel to one another in said optical waveguide body, and each of said optical waveguides has a respective associated transmitting or receiving component.

16. A transmitting and/or receiving apparatus for transmitting and/or receiving light for at least two data channels, which comprises a plurality of modules according to claim 1 arranged one behind another, the optical output of one of the modules being coupled to the optical input of an adjacent one of the modules.

17. The transmitting and/or receiving apparatus according to claim 16, wherein one of said plurality of modules includes means for connection of an optical fiber, whereby the optical fiber is coupled to said at least one optical waveguide of said one module.

18. The module according to claim 4, wherein said first end and said second end are disposed at different edges of said module.

19. A module for optical signal transmission, comprising:

a carrier;

at least one transmitting or receiving component mounted on said carrier;

at least one optical waveguide having an optical axis, a first end representing an optical input of the module, and a second end representing an optical output of the module, said first and second ends being configured to be coupled to a further optical signal transmission modules or to an optical fiber; and a wavelength-selective element disposed in said at least one optical waveguide an configured to couple light of a specific optical data channel from said at least one optical waveguide to said at least one transmitting or receiving component or to inject light emitted from said at least one transmitting or receiving element into said at least one optical waveguide;

the light being injected into or coupled out of said at least one optical waveguide substantially perpendicular to said optical axis of said at least one optical waveguide.

\* \* \* \* \*